United States Patent [19]
Yamamoto

[11] Patent Number: 6,118,588
[45] Date of Patent: Sep. 12, 2000

[54] ILLUMINATION OPTICAL SYSTEM AND PROJECTOR APPARATUS USING THE SAME

[75] Inventor: Chikara Yamamoto, Omiya, Japan

[73] Assignee: Fuji Photo Optical Co., Ltd., Saitama, Japan

[21] Appl. No.: 09/272,330

[22] Filed: Mar. 19, 1999

[30] Foreign Application Priority Data

Mar. 26, 1998 [JP] Japan ................................. 10-098377

[51] Int. Cl.$^7$ ........................ G02B 27/10; F21V 29/00
[52] U.S. Cl. .......................................... 359/618; 362/268
[58] Field of Search ................................ 359/618, 619; 362/268

[56] References Cited

U.S. PATENT DOCUMENTS 4,769,750   9/1988   Matsumoto et al. ................ 362/268
5,418,583   5/1995   Matsumoto ............................ 353/38

*Primary Examiner*—Ricky Mack
*Attorney, Agent, or Firm*—Snider & Associates; Ronald R. Snider

[57] ABSTRACT

In an illumination optical system comprising a light source section 10, an integrator section 11, and condenser lenses 15, 28, the common optical axis $X_0$ of the light source section 10 and integrator section 11 and the common optical axis $X_1$ of the two condenser lenses 15, 28 are shifted in parallel from each other by a predetermined distance. As a consequence, each principal ray incident on a projection lens 25 is made oblique to the optical axis $X_2$ of the projection lens 25, whereby the side of a liquid crystal display panel 23 from the projection lens 25 is formed as a non-telecentric system.

14 Claims, 4 Drawing Sheets

ILLUMINATION OPTICAL SYSTEM AND PROJECTOR APPARATUS USING THE SAME

RELATED APPLICATIONS

This application claims the priority of Japanese Patent Application No. 10-98377 filed on Mar. 26, 1998, which is incorporated herein by reference.

BACKGROUND OF THE INVENTION

1. Field of the Invention

The present invention relates to an illumination optical system for enlarging an image displayed on image display means such as a liquid crystal display panel or micromirror device panel and projecting thus enlarged image onto a screen, and a projector apparatus using the same; and, in particular, to an illumination optical system in which the relative positional relationship between an integrator section for homogenizing the illumination of light illuminating the image display means and other optical members is improved, and a projector apparatus using the same.

2. Description of the Prior Art

In illumination optical systems for liquid crystal projectors, there has conventionally been known a technique using an optical system which employs an integrator for eliminating unevenness in illumination on liquid crystal display panels.

Namely, such an illumination optical system comprises a first integrator plate (generally known as second flyeye or the like), a second integrator plate (generally known as first flyeye or the like), and a condenser lens successively disposed in this order downstream a light source section using a reflector. The first integrator plate is constituted by a plurality of lens elements, each having a form substantially analogous to that of a liquid crystal display panel, which are arranged two-dimensionally, and splits a luminous flux having a relatively higher degree of unevenness in brightness emitted from the light source section into partial luminous fluxes by the number identical to that of the lens elements in the first integrator plate. Thus obtained partial luminous flux has a lower degree of unevenness in brightness as compared with the luminous flux before being split. By means of the second integrator plate and the condenser lens, the individual partial luminous fluxes are emitted toward an area to be illuminated, so as to be superposed on one another, whereby it is possible to realize illumination with less unevenness in brightness.

Meanwhile, since the projection lens employed in a liquid crystal projector is often used as being shifted in a direction perpendicular to the optical axis of its liquid crystal display panel, it is generally designed such that its liquid crystal side is formed into a telecentric system. Also, in conjunction therewith, the illumination optical system using an integrator is generally designed as a system in which the luminous flux becomes telecentric after passing through the liquid crystal display panel. When such a telecentric system is formed, however, it may be problematic in that a large number of lenses are needed as the projection lens, each lens has a larger diameter, and so forth, thereby increasing the size and cost of the apparatus.

Therefore, a so-called non-telecentric system in which the luminous flux does not become telecentric after passing through the liquid crystal display panel may be constructed. However, in the case where a conventional illumination optical system employing an integrator used in a liquid crystal projector is disposed so as to be inclined as a whole with respect to the liquid crystal display panel, it becomes necessary to newly design support members for individual members of the illumination optical system, a housing for accommodating the illumination optical system, and the like, whereby such a change may not always be easy.

As image display means, attention has recently been given to the micromirror device panel (DMD) in which a plurality of micromirror devices are arranged. In the micromirror device panel, it is necessary that a luminous flux be made obliquely incident thereon while forming a predetermined angle with the normal of the panel. Therefore, in the case where such a micromirror device panel is used as the image display means, it is difficult to simply use the illumination optical system mounted in the conventional liquid crystal projector.

SUMMARY OF THE INVENTION

In view of such circumstances, it is an object of the present invention to provide an illumination optical system and a projector apparatus which can form a non-telecentric system obliquely emitting a luminous flux which emanates from image display means illuminated by the illumination optical system using an integrator with respect to a normal of the image display means without greatly changing the configuration of the illumination optical system employed in the conventional liquid crystal projector, thereby being able to make the apparatus smaller and less expensive.

It is another object of the present invention to provide an illumination optical system and a projector apparatus which can favorably illuminate a micromirror device panel without greatly changing the configuration of the illumination optical system employed in the conventional liquid crystal projector.

The illumination optical system in accordance with a first aspect of the present invention is an illumination optical system for illuminating image display means which modulates incident light according to image information;

the illumination optical system comprising a light source section; an integrator section including at least two integrator plates, arranged in an optical axis direction of the light source section, for homogenizing the quantity of light emitted from the light source section; and at least one condenser lens positioned between the integrator section and the image display means;

wherein an optical axis of the condenser lens closest to the image display means in the at least one condenser lens and an optical axis of the integrator section are shifted substantially in parallel from each other by a predetermined distance so that a principal ray in each luminous flux emitted from the image display means approaches an optical axis of the projection lens.

The illumination optical system in accordance with a second aspect of the present invention is an illumination optical system for illuminating three image display means which modulate color light components of blue, green, and red, respectively, according to image information;

the illumination optical system comprising a light source section for emitting white light; an integrator section including at least two integrator plates, arranged in an optical axis direction of the light source section, for homogenizing the quantity of the white light; and at least one condenser lens positioned between the integrator section and the image display means;

wherein an optical axis of the condenser lens closest to the image display means in the at least one condenser lens and an optical axis of the integrator section are shifted substantially in parallel from each other by a predetermined distance so that a principal ray in each luminous flux emitted from the image display means approaches an optical axis of the projection lens.

Preferably, at least two integrator plates constituting the integrator section have forms and sizes identical to each other, since their manufacturing costs can be lowered thereby.

The optical axis of the condenser lens and the optical axis of the projection lens may be shifted substantially in parallel from each other by a predetermined distance.

Also, the optical axis of the condenser lens and the optical axis of the projection lens may align with each other.

The image display means may be constituted by a liquid crystal display panel or micromirror device panel.

The projector apparatus in accordance with the present invention is constructed such that the luminous flux emitted from the illumination optical system so as to travel by way of the image display means is enlarged and projected onto a screen by a projection lens.

Here, the above-mentioned term "condenser lens" refers to a single lens or lens group, which belongs to a so-called converging lens, having a positive refracting power for converging illumination light from a light source section, and its form is not restricted to any particular one.

DESCRIPTION OF THE PREFERRED EMBODIMENTS

In the following, embodiments of the present invention will be explained with reference to the accompanying drawings.

Figure 2:
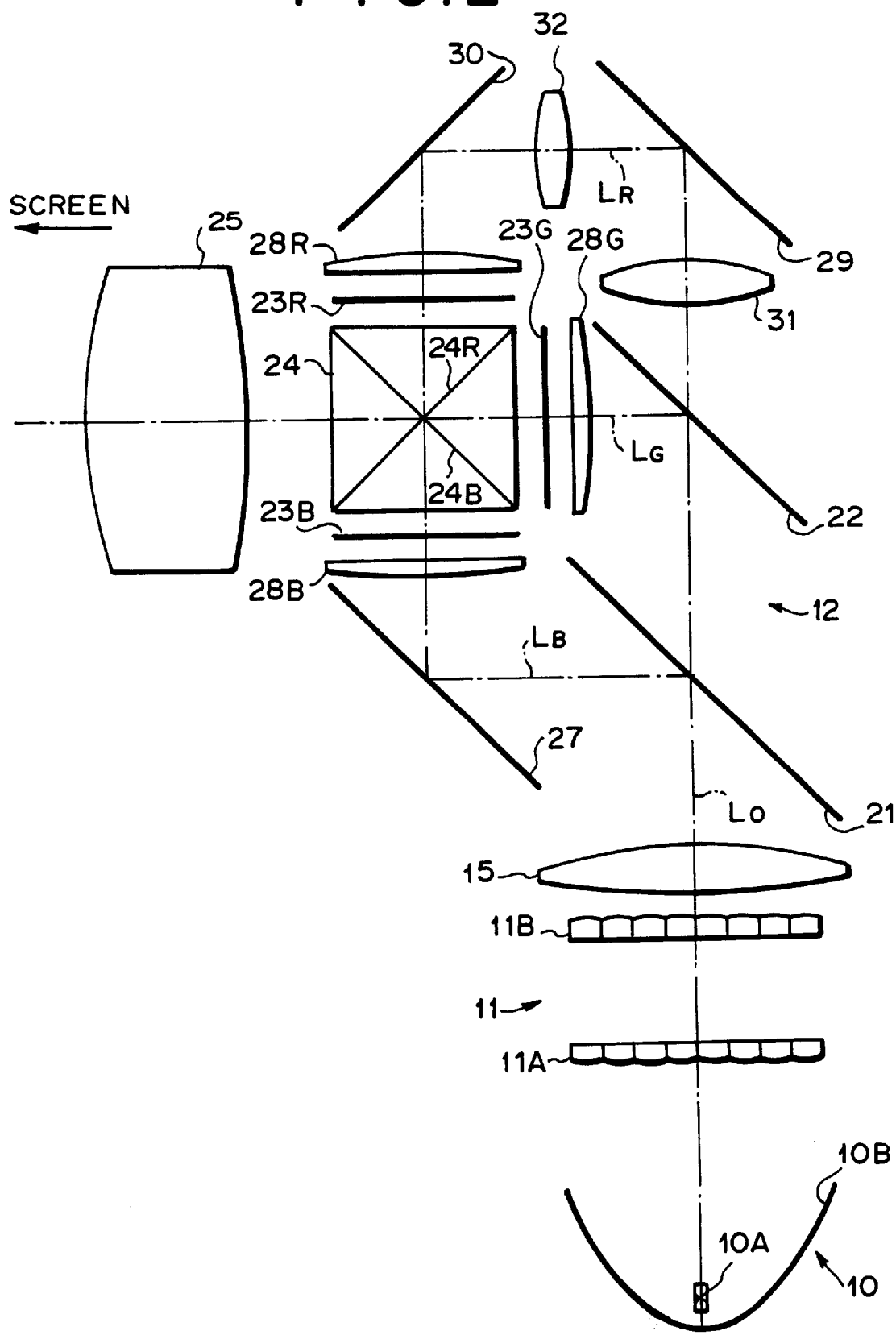
FIG. 2 is a schematic plan view showing a projection type liquid crystal projector apparatus using the illumination optical system of FIG. 1.

FIG. 2 is a schematic view showing the configuration of a projection type liquid crystal projector apparatus equipped with the illumination optical system in accordance with a first embodiment. As shown in FIG. 2, the projection type liquid crystal projector apparatus in accordance with the first embodiment comprises a light source section 10, an integrator section 11 for mixing a white luminous flux emitted from the light source section 10 so as to homogenize its light quantity distribution, and a projector section 12 for causing the luminous flux turned into homogenous light by the integrator section 11 to carry color image information and projecting this light onto a screen.

Figure 1:
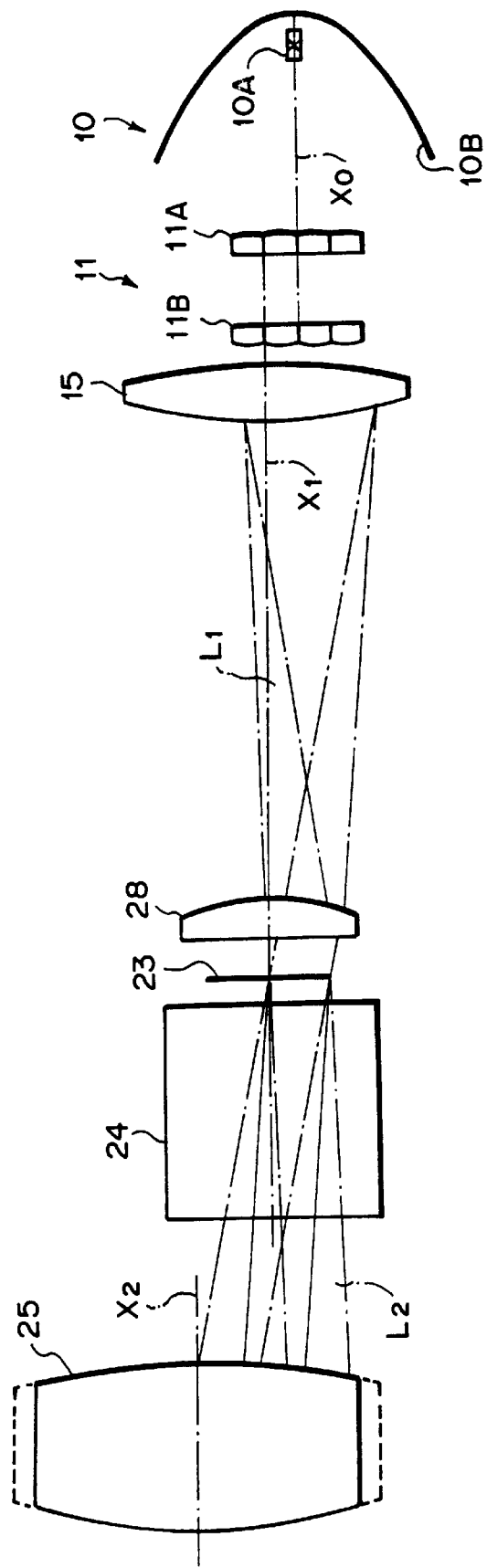
FIG. 1 is a schematic view showing an illumination optical system in accordance with a first embodiment of the present invention.

As shown in FIG. 1, the light source section 10 comprises an illuminator 10A made of a discharge tube such as xenon lamp or halide lamp, and a reflector 10B made of a parabolic mirror.

Namely, the reflector 10B made of a parabolic mirror has a focal position at the light-emitting source of the illuminator 10A and reflects part of the luminous flux emitted from the illuminator 10A toward the backside and outside of the optical axis $L_0$ of the light source section 10 as a luminous flux substantially parallel to the optical axis $L_0$.

The integrator section 11 comprises a second flyeye (first integrator plate) 11A acting on the luminous flux from the light source section 10, a first flyeye (second integrator plate) 11B for superposing the respective luminous fluxes from individual lens elements of the second flyeye 11A onto liquid crystal display panels which will be explained later, and a condenser lens 15.

Each of the two flyeyes 11A, 11B is constituted by minute lens elements arranged regularly. Each lens element has a form analogous to the effective area of each of liquid crystal display panels 23B, 23G, 23R.

On the other hand, the projector section 12 comprises a B/GR separating dichroic mirror 21 for separating the luminous flux homogenized by the integrator section 11 into a B component LB and a GR component LG, LR; a G/R separating dichroic mirror 22 for separating the GR component LG, LR emanating from the dichroic mirror 21 into a G component LG and an R component LR; a liquid crystal display panel 23B for displaying an image for the B component; a liquid crystal display panel 23G for displaying an image for the G component; a liquid crystal display panel 23R for displaying an image for the R component; a three-color-combining prism 24 for combining the luminous flux components LB, LG, LR, each carrying image information, transmitted through their respective liquid crystal display panels 23B, 23G, 23R; and a projection lens 25 for projecting the luminous flux composed by the three-color-combining prism 24 onto a screen (not illustrated). The projector section 12 further comprises a total reflection mirror 27 for reflecting the B component LB emanating from the B/GR separating dichroic mirror 21 toward the liquid crystal display panel 23B; a condenser lens 28B for turning the B component LB reflected by the total reflection mirror 27 into parallel light; a condenser lens 28G for turning the G component LG emanating from the G/R separating dichroic mirror 22 into parallel light; total reflection mirrors 29, 30 for reflecting the R component LR emanating from the G/R separating dichroic mirror 22 toward the liquid crystal display panel 23R; and a condenser lens 28R for turning the R component LR emanating from the G/R separating dichroic mirror 22 into parallel light.

In this projection type liquid crystal projector apparatus, only the R component LR differs from the other components in terms of the optical path length to the three-light-combining prism 24. However, a condenser lens 31 is disposed between the G/R separating dichroic mirror 22 and the total reflection mirror 29, whereas a relay lens 32 is disposed between the total reflection mirrors 29, 30, so that the imaging relationship of the R component LR is corrected so as to become apparently equivalent to those of the B component LB and G component LG.

The three-color-combining prism 24 is a cross prism having a dichroic surface 24B for reflecting the B component LB and a dichroic surface 24R for reflecting the R component LR.

In the projection type projector apparatus, the liquid crystal display panels 23B, 23G, 23R are often used as being shifted in a direction perpendicular to the optical axis of the projection lens 25. Conventionally, it has been a common practice to form a telecentric system on the side of the liquid crystal display panels 23B, 23G, 23R from the projection lens 25, and also arrange the illumination optical system such that it becomes a system in which the luminous flux becomes telecentric after passing through the liquid crystal display panels 23B, 23G, 23R. However, forming such a telecentric system is disadvantageous in that a large number of lenses are necessary as the projection lens 25, the diameter of each lens becomes greater, and so forth.

Therefore, in this embodiment, as shown in FIG. 1 (partly omitting optical members), in the illumination optical system constituted by the light source section 10, integrator section 11, and condenser lenses 15, 28, the individual members are disposed such that the common optical axis $X_0$ of the light source section 10 and integrator section 11 and the common optical axis $X_1$ of the condenser lenses 15, 28 are shifted in parallel from each other by a predetermined distance. In this embodiment, the center axis of the liquid crystal display panel 23 aligns with the common optical axis $X_1$ of the condenser lenses 15, 28, whereas the projection lens 25 is disposed such that its optical axis $X_2$ is positioned on the opposite side of the common axis $X_0$ of the light source section 10 and integrator section 11 with respect to the common axis $X_1$ of the condenser lenses 15, 28.

Since the integrator section 11 is thus disposed (at a position shifted downward in the drawing) so as to be asymmetrical about the common optical axis $X_1$ of the condenser lenses 15, 28, the illumination light emitted from the light source section 10 and homogenized by the integrator section 11 is made incident on the condenser lens 15 at a position shifted from the center thereof. Then, the luminous flux $L_1$, from the condenser lens 15 is made incident on the condenser lens 28, disposed immediately in front of the liquid crystal display panel 23, at a position shifted from the center thereof. Consequently, as depicted, the illumination luminous flux $L_1$, emanating from the condenser lens 28 illuminates the liquid crystal display panel 23 obliquely from the lower side of the drawing. Thereafter, the luminous flux $L_2$, carrying the color image information, transmitted through the liquid crystal display panel 23 and composed by the three-color-combining prism 24 is made obliquely incident on the projection lens 25 so as to approach its optical axis $X_2$. As a consequence, each principal ray incident on the projection lens 25 is made oblique with respect to the optical axis $X_2$ of the projection lens 25, whereby the side of the liquid crystal display panel 23 from the projection lens 25 is formed as a non-telecentric system.

Hence, the projection lens 25 can reduce its number of lenses. Also, as depicted, its diameter can be made smaller than the lens size (indicated by broken line) in the case of a telecentric system.

In this embodiment, the two flyeyes (integrator plates) 11A, 11B have forms identical to each other, and the lens elements constituting the flyeyes 11A, 11B have forms identical to each other, whereby the manufacturing cost of the flyeyes 11A, 11B can be reduced. However, the two flyeyes 11A, 11B and their constituent lens elements may not have forms or sizes identical to each other.

Figure 3:
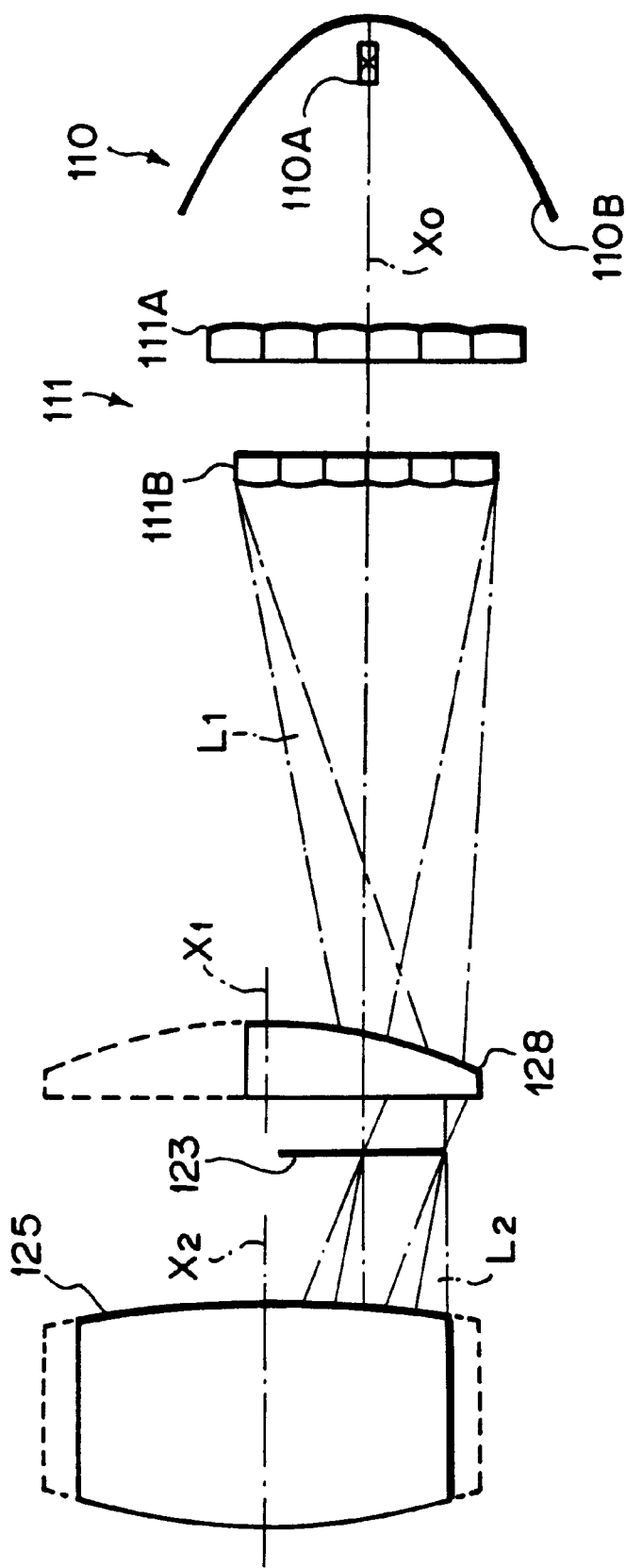
FIG. 3 is a schematic view showing an illumination optical system in accordance with a second embodiment of the present invention.

FIG. 3 is a schematic view showing a part of the configuration of a projection type liquid crystal display panel equipped with the illumination optical system in accordance with a second embodiment of the present invention. This projection type liquid crystal projector apparatus is similar to that of the above-mentioned first embodiment in that it comprises an illumination optical system constituted by a light source section 110, an integrator section 111, and a condenser lens 128 (whose nonessential upper part being cut off); a liquid crystal display panel 123; and a projection lens 125; and in that the individual members are disposed so as to shift the common optical axis $X_0$ of the light source section 110 and integrator section 111 and the common optical axis $X_1$ of the condenser lens 128 in parallel from each other by a predetermined distance; while being different therefrom in that the common optical axis $X_0$ of the light source section 110 and integrator section 111 aligns with the center axis of the liquid crystal display panel 123 and in that optical axis $X_1$ of the condenser lens 128 aligns with the optical axis $X_2$ of the projection lens 125.

Also, the second embodiment differs from the first embodiment in that two flyeyes 111A, 111B constituting the integrator section 111 have sizes different from each other, and the respective lens elements constituting the flyeyes 111A, 111B have sizes different from each other; in that one condenser lens 128 is disposed between the integrator section 111 and the liquid crystal display panel 123; and in that the liquid crystal display panel 123 is of a single-plate type with neither color-separating optical system nor three-color-combining prism being provided.

Though thus being different from the first embodiment in various structures, the second embodiment can attain effects similar to those of the first embodiment due to the fact that the optical axis $X_0$ of the integrator section 111 and the optical axis $X_1$ of the condenser lens 128 are shifted in parallel from each other by a predetermined distance.

Namely, the illumination luminous flux $L_1$ emitted from the light source section 110 and homogenized by the integrator section 111 is made incident on the condenser lens 128, disposed immediately in front of the liquid crystal display panel 123, at a position shifted from the center thereof. Consequently, as depicted, the illumination luminous flux $L_1$ emitted from the condenser lens 128 illuminates the liquid crystal display panel 123 obliquely from the lower side of the drawing. Thereafter, the luminous flux $L_2$, carrying the image information, transmitted through the liquid crystal display panel 123 is made obliquely incident on the projection lens 125 so as to approach its optical axis $X_2$. As a consequence, each principal ray incident on the projection lens 125 is made oblique with respect to the optical axis $X_2$ of the projection lens 125, whereby the side of the liquid crystal display panel 123 from the projection lens 125 is formed as a non-telecentric system.

Hence, in this embodiment, the projection lens 125 can reduce its number of lenses. Also, as depicted, its diameter can be made smaller than the lens size (indicated by broken line) in the case of a telecentric system.

The illumination optical system of the present invention is applicable not only to projection type liquid crystal projector apparatus using liquid crystal display panels but also to various kinds of projector apparatus using other image display means. For example, as shown in FIG. 4, the illumination optical system of the present invention is also applicable to a projector apparatus using a so-called DMD (digital mirror device), in which micromirror devices are arranged, as its image display means.

Figure 4:
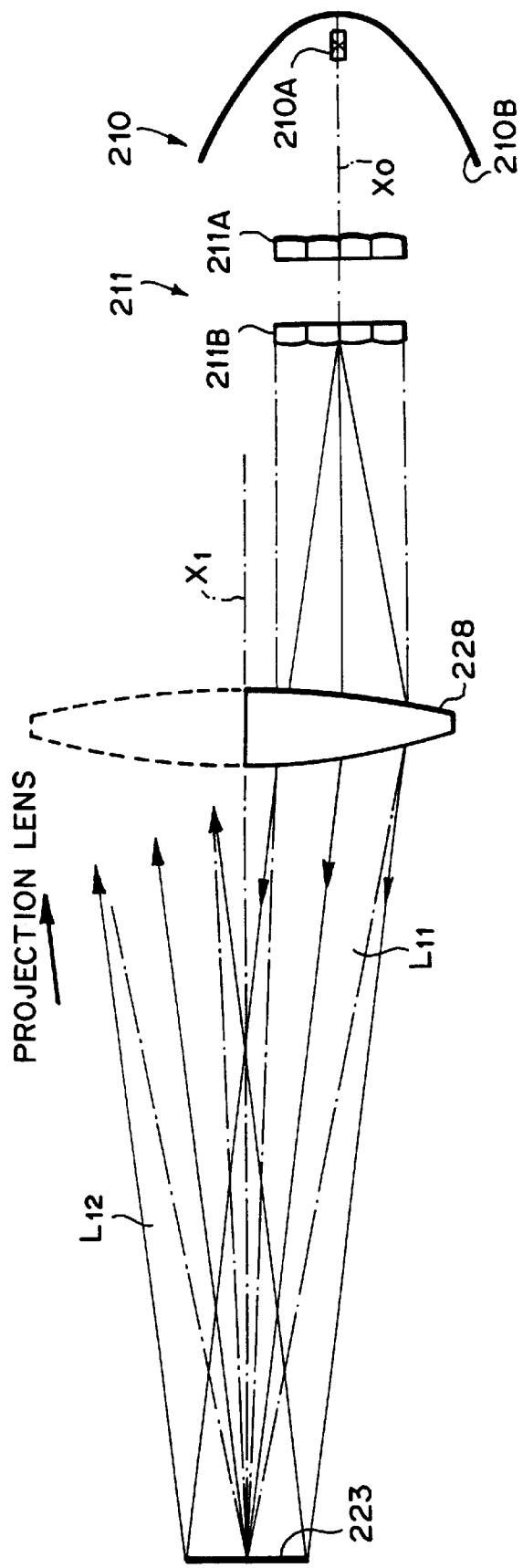
FIG. 4 is a schematic view showing an illumination optical system in accordance with an embodiment different from those of FIGS. 1 and 3.

In the apparatus shown in FIG. 4, an illumination luminous flux $L_{11}$, emitted from an illumination optical system comprising a light source section 210, an integrator section 211, and a condenser lens 228 (whose nonessential upper part being cut off) obliquely irradiates a DMD 223, so that a luminous flux $L_{12}$ modulated by an image signal is reflected by the DMD 223 toward a projection lens (not illustrated), and then the luminous flux $L_{12}$ carrying image information is enlarged and projected onto a screen (not illustrated).

Here, the light source section 210 comprises an illuminator 210A and a reflector 210B. The integrator section 211 comprises two flyeyes (integrator plates) 211A, 211B. As with the above-mentioned embodiments, the common optical axis $X_0$ of the integrator section 211 and the optical axis $X_1$ of the condenser lens 228 are disposed in the state shifted in parallel from each other (shifted in both of a vertical direction of the drawing and a direction perpendicular to the paper surface) by a predetermined distance.

Namely, since the illumination luminous flux $L_{11}$ emitted from the light source section 210 and homogenized by the integrator section 211 is made incident on the condenser lens 228, disposed immediately in front of the DMD 223, at a position shifted from the center thereof, the illumination luminous flux $L_{11}$, emitted from the condenser lens illuminates the DMD 223 obliquely in both of a vertical direction of the drawing and a direction perpendicular to the paper surface.

Without being restricted to the above-mentioned embodiments, the illumination optical system of the present invention and the projector apparatus using the same can be modified in various manners. For example, though a plurality of condenser lenses are configured to have a common optical axis in the above-mentioned embodiments, as long as the optical axis of the condenser lens closest to the image display means among the condenser lenses positioned between the integrator section and the image display means and the optical axis of the integrator section are shifted substantially in parallel from each other by a predetermined distance, it is not always necessary for this condenser lens and the other condenser to have a common optical axis.

Also, it is not necessary for the center axis of the image display means to align with one of the optical axis of the integrator section and the optical axis of the condenser lens.

The configurations of lens systems shown in FIGS. 1, 3, and 4 are merely examples for explanation, and the kind of lenses, the number of lenses, and so forth can be changed appropriately as circumstances demand.

As explained in the foregoing, in the illumination optical system of the present invention, among the condenser lenses positioned between the integrator section and the image display means, the optical axis of the condenser lens closest to the image display means and the optical axis of the integrator section are shifted substantially in parallel from each other by a predetermined distance, so that the image display means is illuminated obliquely, whereby a non-telecentric system is formed on the image display means side of the projection lens. Consequently, as compared with the conventional illumination optical system, without adding other particular members, the number of lenses in the projection lens can be cut down, and the diameter of each lens can be reduced, whereby the apparatus can be made more compact and less expensive. In particular, since the above-mentioned effects can be obtained when a combination of the integrator and light source section or the condenser lens closest to the image display means in a conventional illumination optical system mounted in a projector apparatus is simply moved by a predetermined distance such that their optical axes keep a parallel state, it is not necessary to greatly change the design of the optical system and its surrounding members, whereby it is quite effective in practice.

Also, since a luminous flux can be made obliquely incident on a micromirror device panel (DMD) while forming a predetermined angle with the normal thereof, the illumination optical system of the present invention can be employed as an illumination optical system for illuminating the micromirror device panel (DMD), without greatly changing the configuration of the illumination optical system mounted in the above-mentioned conventional liquid crystal projector.

The projector apparatus using the above-mentioned illumination optical system can attain similar effects, thereby being capable of making the apparatus more compact and less inexpensive, without greatly changing the design of the conventional apparatus or lowering the utilization efficiency of illumination light. Also, the present invention is easily applicable to projector apparatus equipped with a micromirror device panel (DMD).

What is claimed is:

1. An illumination optical system for illuminating image display means which modulates incident light according to image information;

said illumination optical system comprising a light source section; an integrator section including at least two integrator plates, arranged in an optical axis direction of said light source section, for homogenizing the quantity of light emitted from said light source section; and at least one condenser lens positioned between said integrator section and said image display means;

wherein an optical axis of said condenser lens closest to said image display means in said at least one condenser lens and an optical axis of said integrator section are shifted substantially in parallel from each other by a predetermined distance so that a principal ray in each luminous flux emitted from said image display means approaches an optical axis of said projection lens.

2. An illumination optical system according to claim 1, wherein at least two integrator plates constituting said integrator section have forms and sizes identical to each other.

3. An illumination optical system according to claim 1, wherein the optical axis of said condenser lens and the optical axis of said projection lens are shifted substantially in parallel from each other by a predetermined distance.

4. An illumination optical system according to claim 1, wherein the optical axis of said condenser lens and the optical axis of said projection lens align with each other.

5. An illumination optical system according to claim 1, wherein said image display means is a liquid crystal display panel.

6. An illumination optical system according to claim 1, wherein said image display means is a micromirror device panel.

7. A projector apparatus using the illumination optical system according to claim 1, wherein the luminous flux emitted from said illumination optical system so as to travel by way of said image display means is enlarged and projected onto a screen by a projection lens.

8. An illumination optical system for illuminating three image display means which modulate color light components of blue, green, and red, respectively, according to image information;

said illumination optical system comprising a light source section for emitting white light; an integrator section including at least two integrator plates, arranged in an optical axis direction of said light source section, for homogenizing the quantity of said white light; and at least one condenser lens positioned between said integrator section and said image display means;

wherein an optical axis of the condenser lens closest to said image display means in said at least one condenser lens and an optical axis of said integrator section are shifted substantially in parallel from each other by a predetermined distance so that a principal ray in each luminous flux emitted from said image display means approaches an optical axis of said projection lens.

9. An illumination optical system according to claim 8, wherein at least two integrator plates constituting said integrator section have forms and sizes identical to each other.

10. An illumination optical system according to claim 8, wherein the optical axis of said condenser lens and the optical axis of said projection lens are shifted substantially in parallel from each other by a predetermined distance.

11. An illumination optical system according to claim 8, wherein the optical axis of said condenser lens and the optical axis of said projection lens align with each other.

12. An illumination optical system according to claim 8, wherein said image display means is a liquid crystal display panel.

13. An illumination optical system according to claim 8, wherein said image display means is a micromirror device panel.

14. A projector apparatus using the illumination optical system according to claim 8, wherein the luminous flux emitted from said illumination optical system so as to travel by way of said image display means is enlarged and projected onto a screen by a projection lens.

* * * * *